United States Patent
Hanson et al.

(10) Patent No.: US 9,540,027 B1
(45) Date of Patent: Jan. 10, 2017

(54) COLLAPSIBLE STROLLER

(71) Applicant: Helen of Troy Limited, Belleville, St. Michael (BB)

(72) Inventors: Thomas C. Hanson, New York, NY (US); Troy H. Phipps, Brooklyn, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 0 days.

(21) Appl. No.: 14/874,820

(22) Filed: Oct. 5, 2015

(51) Int. Cl.
*B62B 7/06* (2006.01)
*B62B 7/08* (2006.01)

(52) U.S. Cl.
CPC .............. *B62B 7/086* (2013.01); *B62B 7/066* (2013.01)

(58) Field of Classification Search
CPC ............ B62B 7/06–7/066; B62B 7/08–7/083; B62B 7/10
See application file for complete search history.

(56) References Cited

U.S. PATENT DOCUMENTS

2011/0291389 A1* 12/2011 Offord ................... B62B 7/062
280/650

OTHER PUBLICATIONS

Britax B-AGILE Stroller User Guide.

* cited by examiner

*Primary Examiner* — Erez Gurari
(74) *Attorney, Agent, or Firm* — Rankin, Hill & Clark LLP (57) ABSTRACT

A collapsible stroller includes a stroller frame, at least one hinge mechanism, and a hinge lock mechanism. The stroller frame is movable between a deployed position and a collapsed position. The at least one hinge mechanism is on the stroller frame and allows for movement of the stroller frame between the collapsed position and the deployed position. The hinge lock mechanism is capable of a locked state and an unlocked state. In the locked state, the hinge lock mechanism locks the at least one hinge mechanism to maintain the stroller frame in the deployed position. In the unlocked state, the hinge lock mechanism allows the stroller frame to move from the deployed position toward the collapsed position. The hinge lock mechanism includes a manually actuated first linkage and a manually actuated second linkage.

20 Claims, 11 Drawing Sheets

COLLAPSIBLE STROLLER

BACKGROUND

The present disclosure is generally related to collapsible strollers. Many strollers collapse, i.e., move between a deployed position and a collapsed position, by folding about a hinge mechanism connecting a handle of the stroller to a leg of the stroller. There are different manners to actuate the hinge mechanism to allow for movement between the deployed position and the collapsed position. Typically, collapsible strollers only require movement of a single actuator to allow for movement from the deployed position to the collapsed position.

SUMMARY

In view of the foregoing, a collapsible stroller includes a stroller frame, at least one hinge mechanism, and a hinge lock mechanism. The stroller frame is movable between a deployed position and a collapsed position. The at least one hinge mechanism is on the stroller frame and allows for movement of the stroller frame between the collapsed position and the deployed position. The hinge lock mechanism is capable of a locked state and an unlocked state. In the locked state, the hinge lock mechanism locks the at least one hinge mechanism to maintain the stroller frame in the deployed position. In the unlocked state, the hinge lock mechanism allows the stroller frame to move from the deployed position toward the collapsed position. The hinge lock mechanism includes a manually actuated first linkage and a manually actuated second linkage. The manually actuated first linkage is moveable between a first position and a second position. The manually actuated second linkage is moveable from an initial position toward a release position when the manually actuated first linkage is in the second position. When the manually actuated second linkage is in the initial position, the hinge lock mechanism is in the locked state. When the manually actuated second linkage is in the release position, the hinge lock mechanism is in the unlocked state.

A method for collapsing a stroller includes moving a manually actuated first linkage, which is provided on a stroller frame moveable between a deployed position and a collapsed position, from a first position to a second position in which the manually actuated first linkage is retained and precluded from movement back toward the first position. With the manually actuated first linkage in the second position, the method further includes moving a manually actuated second linkage from an initial position toward a release position. With the manually actuated second linkage in the release position, the method further includes folding the stroller frame from the deployed position to the collapsed position.

DETAILED DESCRIPTION

Figure 1:
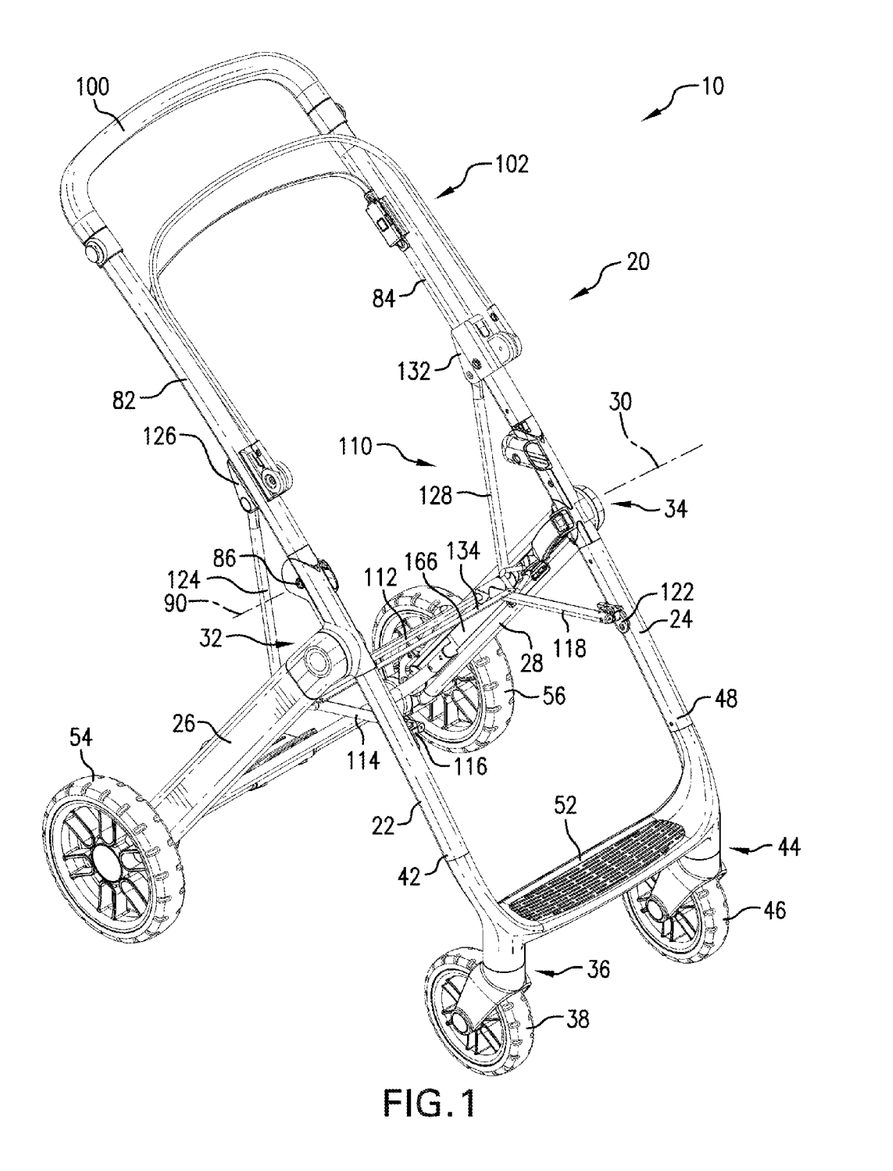
FIG. 1 is a front perspective view of a stroller frame in a deployed position.
Figure 2:
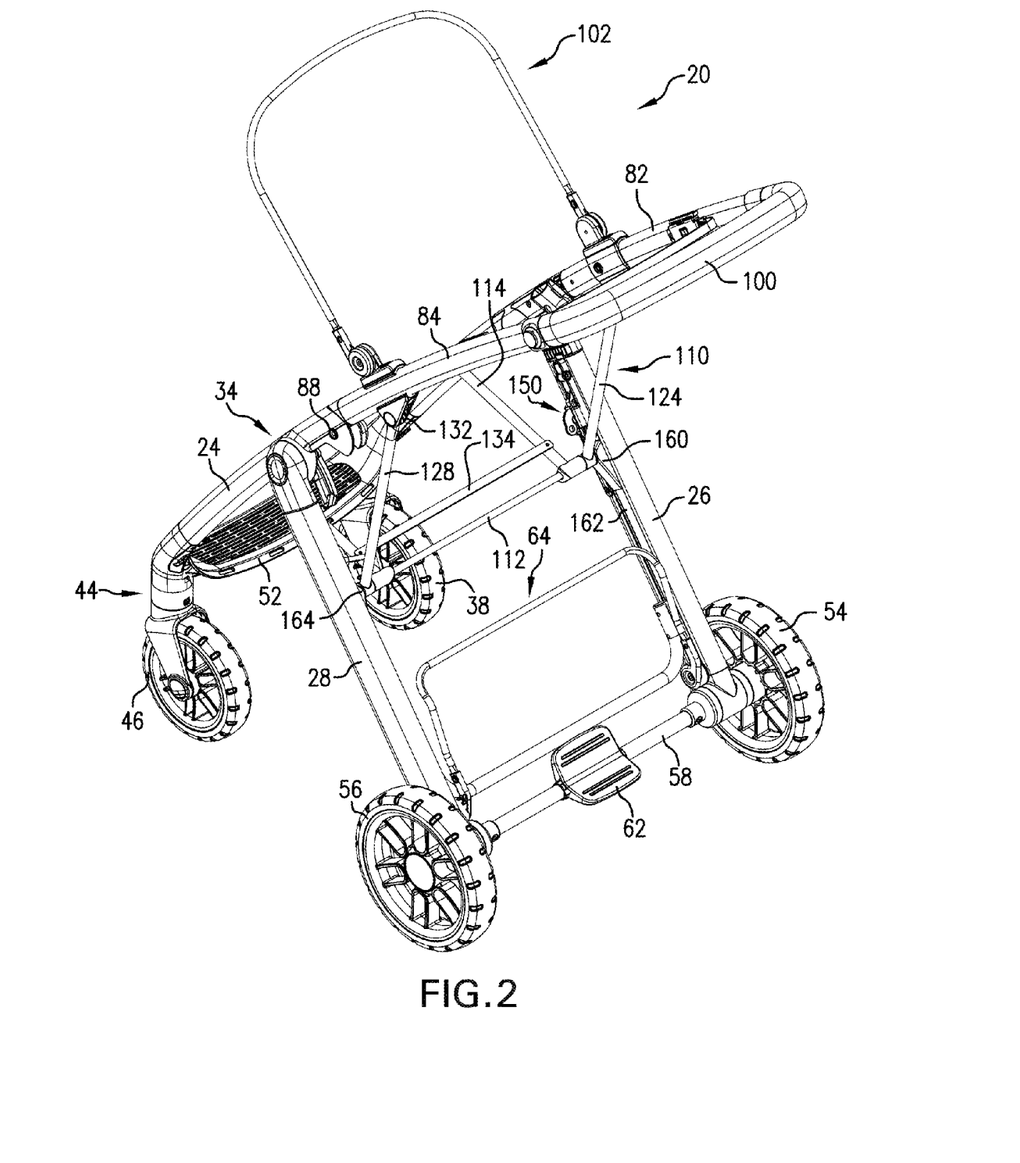
FIG. 2 is a rear perspective view of the stroller frame in the deployed position.
Figure 3:
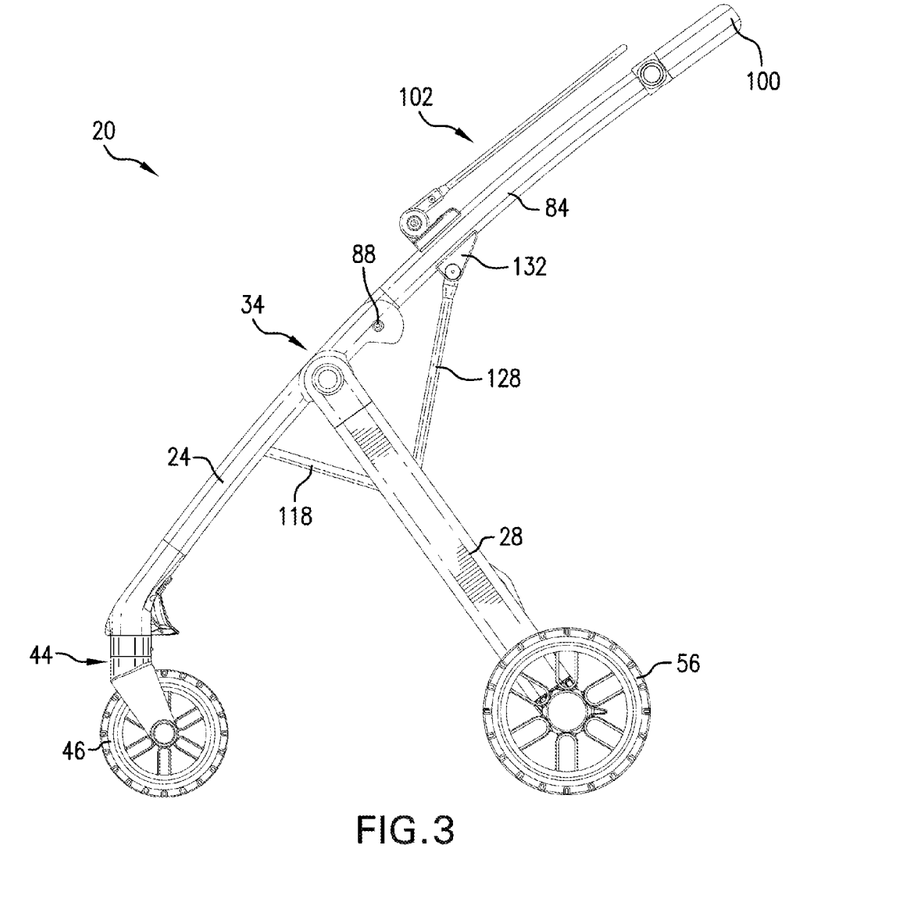
FIG. 3 is a side elevation view of the stroller frame in the deployed position.
Figure 4:
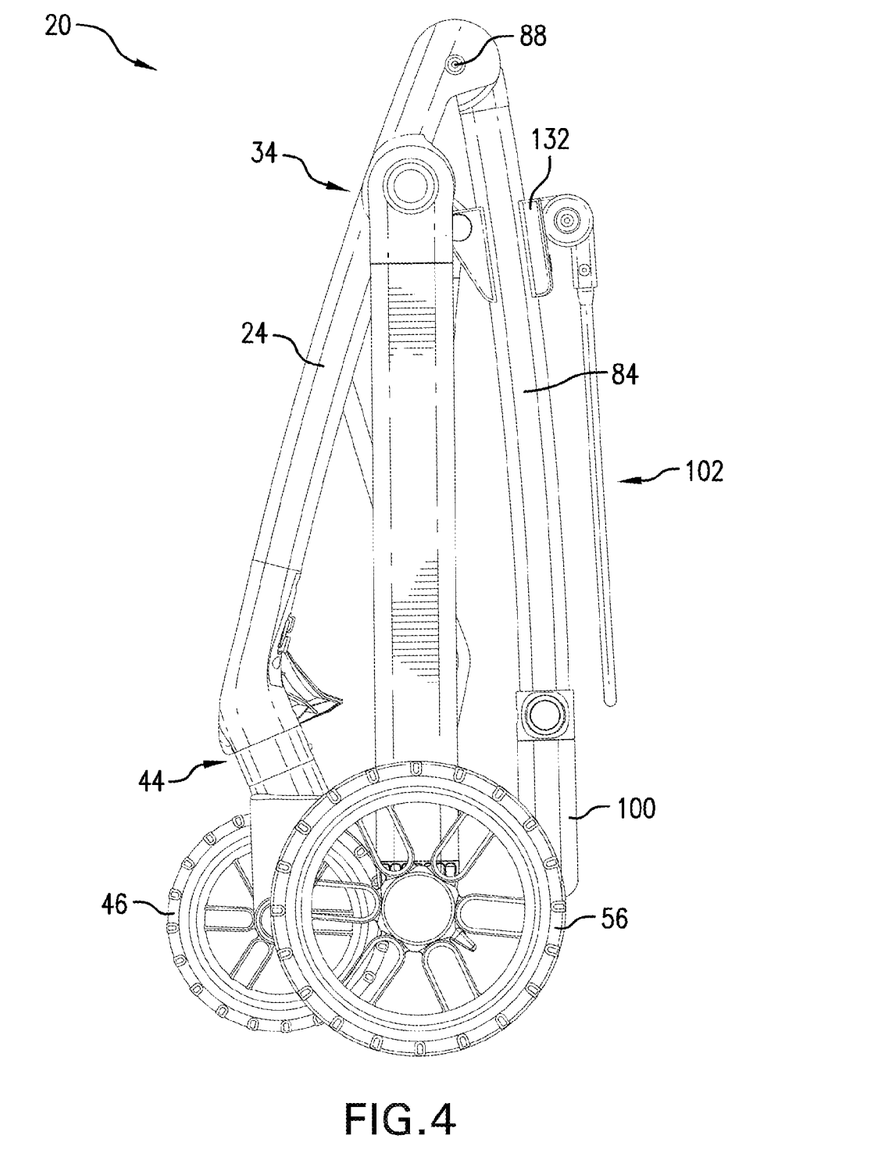
FIG. 4 is a side elevation view of the stroller frame in a collapsed position.

With reference to FIG. 1, a stroller 10 includes soft goods (not shown in FIG. 1) that can include a seat 14 (see FIGS. 10 and 11), a canopy (not shown) and a basket (not shown). The stroller 10 further includes a stroller frame 20 that supports the soft goods. The soft goods can vary considerably in configuration and are not shown in detail to provide more clarity to the drawings. The stroller frame 20 (as well as the stroller 10) is moveable between a deployed position, which is shown in FIGS. 1-3, and a collapsed position, which is shown in FIG. 4.

The stroller frame 20 includes a front right leg 22 and a front left leg 24. The stroller frame 20 also includes a rear right leg 26 and a rear left leg 28. The front legs 22, 24 can pivot with respect to the rear legs 26, 28 about a leg collapse axis 30. The front right leg 22 connects with the rear right leg 26 at a right hinge mechanism 32. The front left leg 24 and the rear left leg 28 connect at a left hinge mechanism 34. The hinge mechanisms 32, 34 on the stroller frame 20 allow for movement of the stroller frame 20 between the collapsed position (shown in FIG. 4) and the deployed position (shown in FIGS. 1-3).

A right swivel mechanism 36 connects a front right wheel 38 to the stroller frame 20 adjacent a lower end 42 of the front right leg 22. Similarly, a left swivel mechanism 44 connects a front left wheel 46 to the stroller frame 20 adjacent a lower end 48 of the front left leg 24. A foot rest 52 attaches to the lower end 42 of the front right leg 22 and to the lower end 48 of the front left leg 24.

A rear right wheel 54 connects with the rear right leg 26 at an end opposite the right hinge mechanism 32. A rear left wheel 56 connects with the rear left leg 28 at an end opposite the left hinge mechanism 34. As more clearly seen in FIG. 2, a rear transverse support 58 connects the rear right wheel 54 and the rear left wheel 56. An actuator pedal 62 can be provided on the rear transverse support 58 to actuate a break mechanism (not shown in detail in FIG. 2), which can be conventional, to prevent the rear wheels 54, 56 from rolling. A basket support frame assembly 64 can connect with the rear legs 26, 28 and provide support for a basket, which is part of the aforementioned soft goods.

A right handle support member 82 connects with the front right leg 22 and is pivotable with respect to the front right leg 22 between an upright position, which is shown in FIGS. 1 and 2, and a folded position, which is shown in FIG. 4. A left handle support member 84 connects with the front left leg 24 and is also pivotable with respect to the front left leg 24 between the upright position and the folded position. Axles 86, 88 connect the right handle support member 82 with the front right leg 22 and the left handle support member 84 with the front left leg 24, respectively. The axles 86, 88 are centered along a handle collapse axis 90. A handle 100, which is used to maneuver the stroller 10, connects with the handle support members 82, 84. A canopy support frame assembly 102 also connects with the handle support members 82, 84. The canopy support frame assembly 102 is provided to support the canopy, which is also part of the aforementioned soft goods.

A seat frame assembly 110 also connects with the stroller frame 20. The seat frame assembly 110 includes a main transverse support member 112 that connects with the rear right leg 26 and the rear left leg 28. A front right support member 114 connects with the main transverse support member 112 and the front right leg 22. A front right bracket 116 is provided to connect the front right support member 114 with the front right leg 22. A front left support member 118 connects the main transverse support member 112 with the front left leg 24 through a front left bracket 122. A rear right support member 124 connects the main transverse support member 112 with the right handle support member 82. A rear right bracket 126 is provided to connect the rear right support member 124 with the right handle support member 82. A rear left support member 128 connects with the main transverse support member 112 and with the left handle support member 84 through a rear left bracket 132. A secondary transverse support member 134 connects the front right support member 114 with the front left support member 118.

The stroller 10 further includes at least one hinge lock mechanism 150 capable of a locked state and an unlocked state. In the locked state, the hinge lock mechanism 150 locks the hinge mechanisms 32, 34 to maintain the stroller frame 20 in the deployed position. While in the locked state, the hinge lock mechanism 150 also precludes pivotal movement of the handle support members 82, 84 with respect to the front legs 22, 24. In the unlocked state, the hinge lock mechanism 150 allows the stroller frame 20 to move from the deployed position toward the collapsed position.

Figure 5:
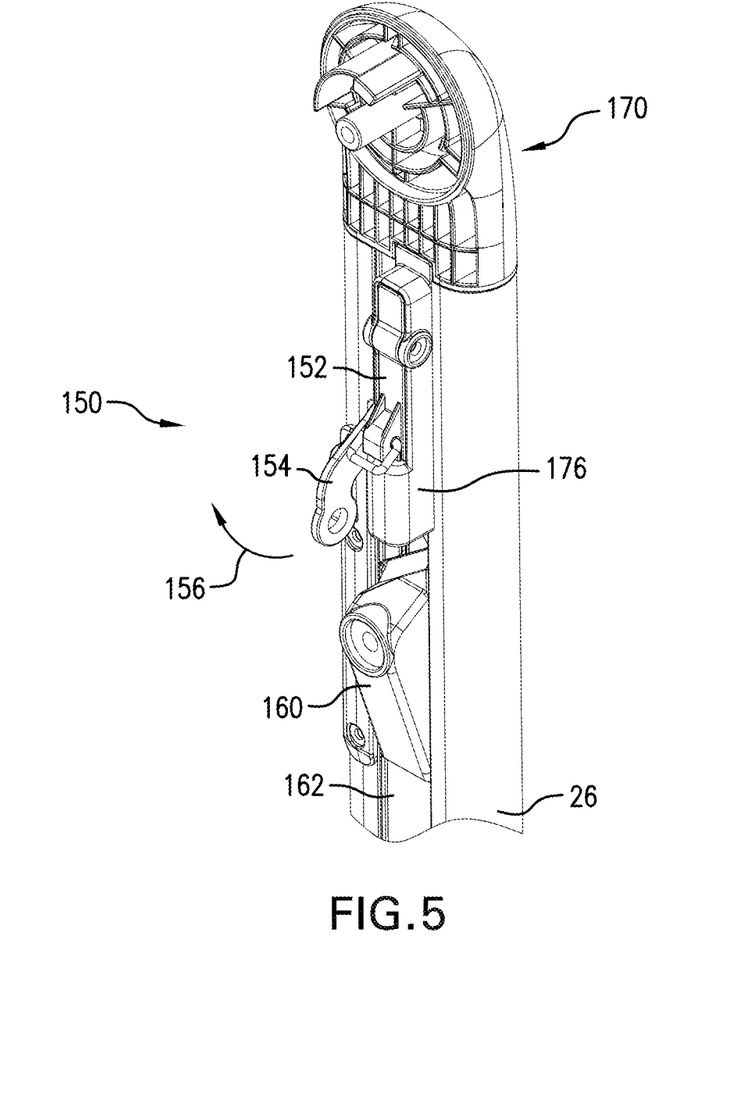
FIG. 5 is a perspective view of a rear leg of the stroller frame and a hinge lock mechanism.
Figure 9:
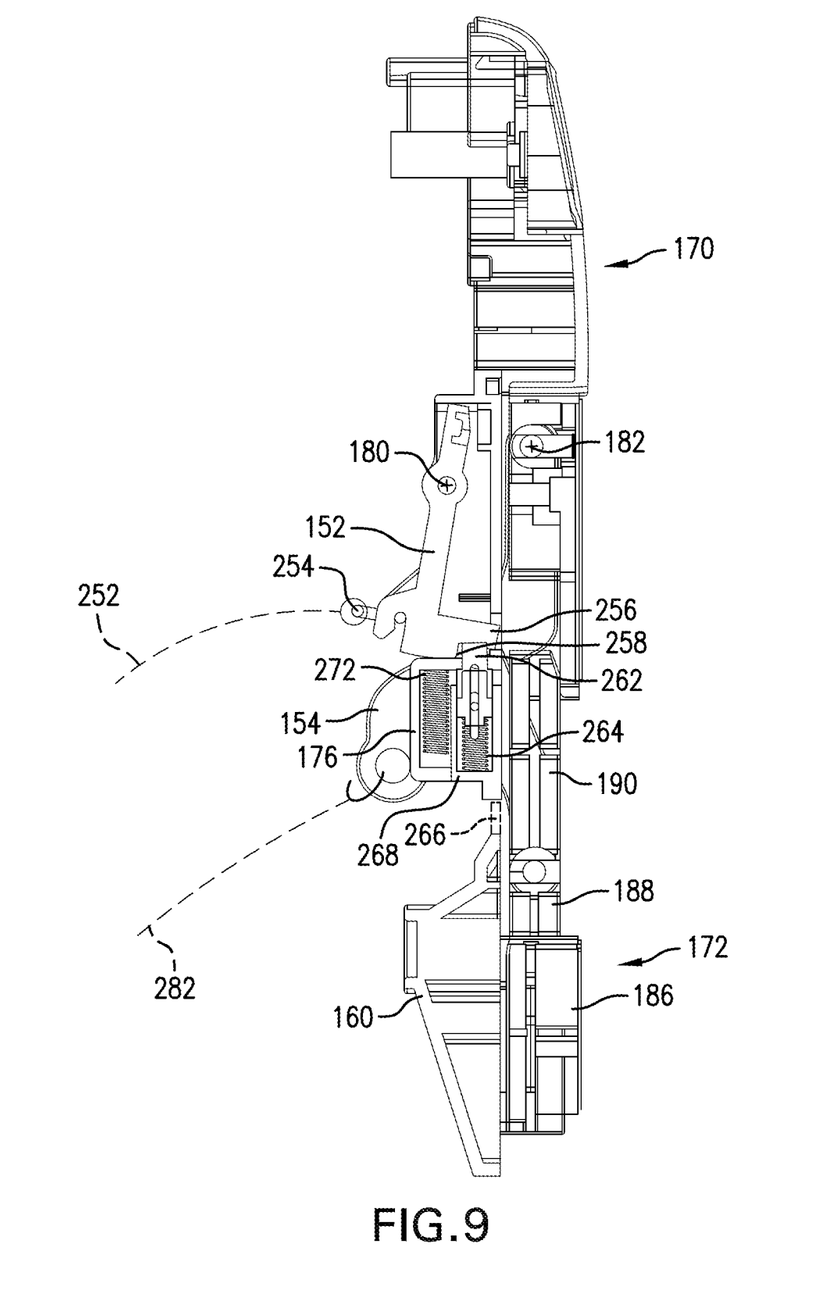
FIG. 9 is a cross-sectional view through the hinge lock mechanism shown in FIG. 7 with a manually actuated first linkage in a second position.

With reference to FIG. 5, the hinge lock mechanism 150 includes a manually actuated first linkage 152 moveable between a first position, which is shown in FIG. 5, and a second position, which is shown in FIG. 9. The hinge lock mechanism 150 also includes a manually actuated second linkage 154 moveable from an initial position, which is shown in FIG. 5, toward a release position, which is in a direction shown by arrow 156 in FIG. 5. The manually actuated second linkage 154 is moveable from the initial position toward the release position when the manually actuated first linkage is in the second position (see FIG. 9). However, when the manually actuated first linkage is in the first position, the manually actuated second linkage 154 is precluded from moving from the initial position toward the release position. When the manually actuated second linkage 154 is in the initial position, the hinge lock mechanism 150 is in the locked state. When the manually actuated second linkage is in the release position, the hinge lock mechanism 150 is in the unlocked state.

FIG. 5 depicts a shuttle 160 (referred to as a right shuttle) and a shuttle track 162 (referred to as a right shuttle track). The right shuttle 160 slides along the right shuttle track 162 as the stroller frame 20 moves between the deployed position and the collapsed position. The right shuttle track 162 is provided in the rear right leg 26. With reference back to FIGS. 1 and 2, a left shuttle 164 is positioned in a left shuttle track 166 provided in the rear left leg 28. The left shuttle 164 slides along the left shuttle track 166 as the stroller frame 20 moves between the deployed position and the collapsed position. The right shuttle 160 is connected with the left shuttle 164 through the main transverse support member 112 of the seat frame assembly 110. The front right support member 114 is pivotally connected with the front right leg 22 and the right shuttle 160. Similarly, the front left support member 118 is pivotally connected with the front left leg 24 and the left shuttle 164. The rear right support member 124 is pivotally connected the right handle support member 82 and the right shuttle 160. The rear left support member 128 is pivotally connected with the left handle support member 84 and the left shuttle 164.

Figure 6:
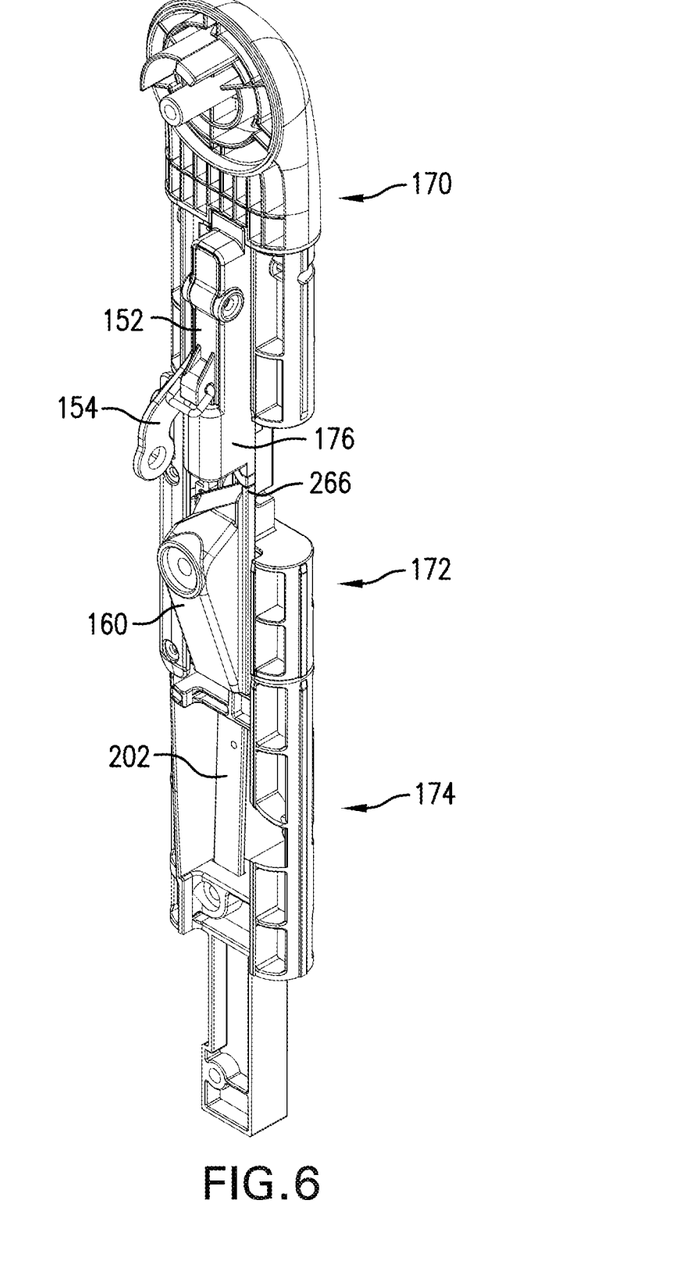
FIG. 6 is a perspective view of the hinge lock mechanism without the rear leg.

With reference to FIG. 6, an upper hinge mechanism frame member 170, a sliding body 172, and a lower hinge lock mechanism frame member 174 are shown. The upper hinge mechanism frame member 170 is fixed to the rear right leg 26 so as to move along with the rear right leg 26. The sliding body 172 is positioned between the upper hinge mechanism frame member 170 and the lower hinge lock mechanism frame member 174. The sliding body 172 is positioned within the rear right leg 26 and moves (translates) with respect to the rear right leg 26. The lower hinge lock mechanism frame member 174 is also fixed to the rear right leg 26 for movement with the rear right leg 26.

A manually actuated first linkage housing cover 176 connects with the upper hinge mechanism frame member 170 and the rear right leg 26. The manually actuated first linkage 152 is pivotally connected with the upper hinge mechanism frame member 170 through a fastener (not shown) and the manually actuated first linkage housing cover 176 for pivotal movement about a first linkage pivot axis 180 (FIG. 9). The manually actuated second linkage 154 is pivotally connected with the upper hinge mechanism frame member 170 through a fastener (not shown) for pivotal movement about a second linkage pivot axis 182 (FIG. 9).

Figure 7:
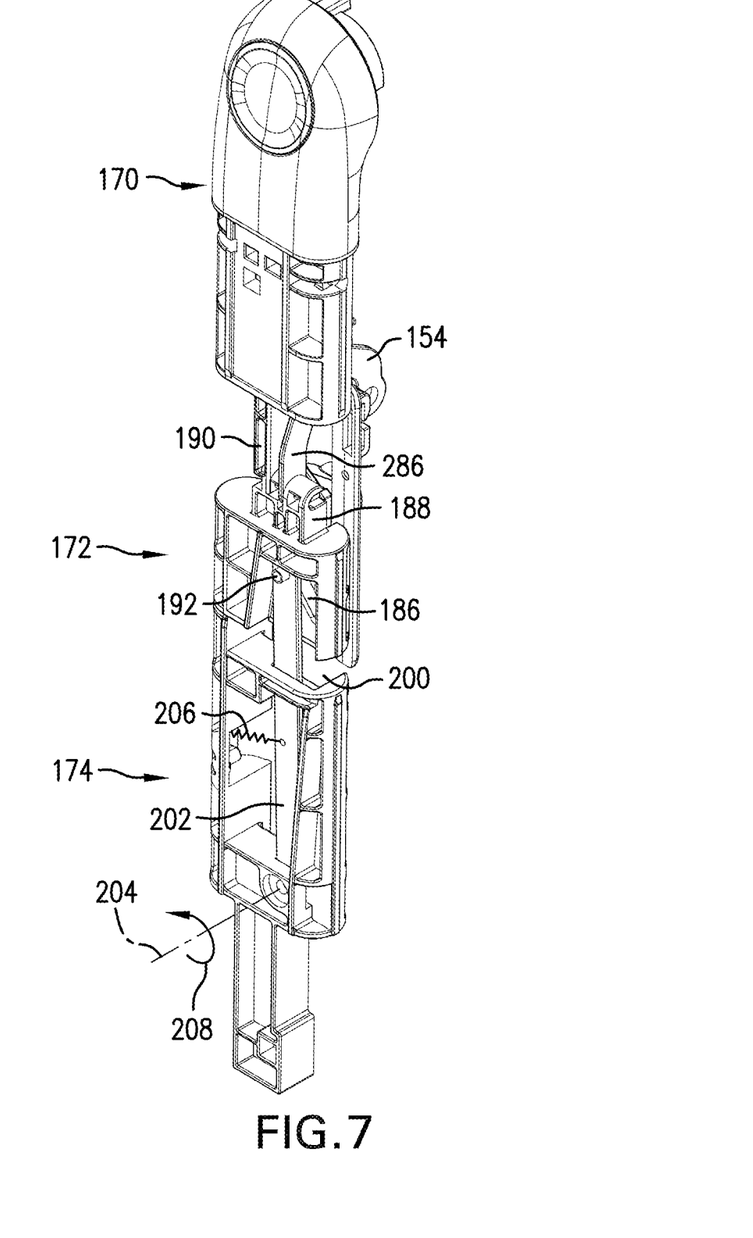
FIG. 7 is a perspective view of the hinge lock mechanism from an opposite perspective of FIG. 6.

As more clearly seen in FIG. 7, the sliding body 172 includes a cam surface 186, a connector 188, and an extension 190. The cam surface 186 is ramp-shaped and configured to cooperate with a shuttle retaining element 192. The connector 188 is provided to operatively connect the manually actuated second linkage 154 with the sliding body 172. The extension 190 cooperates with the manually actuated first linkage 152. When the manually actuated first linkage 152 is in the first position (see FIG. 5) the extension 190 on the sliding body 172 contacts (or is spaced closely to so as to nearly contact) the manually actuated first linkage 152 so as to preclude upward (per the orientation shown in FIG. 9) movement of the sliding body 172. When the manually actuated first linkage 152 is in the second position (shown in FIG. 9), upward movement of the sliding body 172 is allowed.

Figure 8:
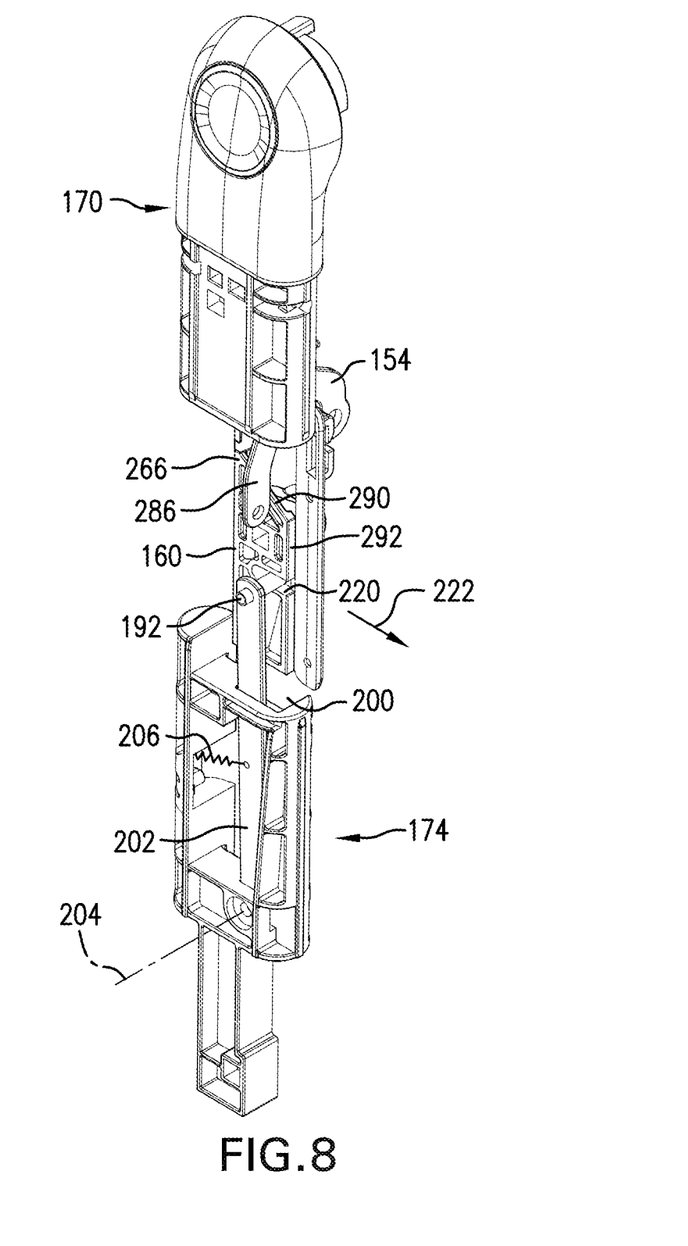
FIG. 8 is a perspective view similar to FIG. 7 with a cam element removed from the hinge lock mechanism.

The lower hinge lock mechanism frame member 174 includes a notch 200, which allows for movement of the shuttle retaining element 192. The shuttle retaining element 192 in the illustrated embodiment is a pin connected with a carrier 202. The carrier 202 in the illustrated embodiment is an elongate bar that is pivotally connected with the lower hinge lock mechanism frame member 174 for pivotal movement about a carrier pivot axis 204. A tension spring 206 is connected with the lower hinge lock mechanism frame member 174 and the carrier 202 to bias the carrier in the direction of arrow 208 in FIG. 7. The shuttle retaining element 192 is moveable between a first location (shown in FIGS. 7 and 8) where the shuttle retaining element 192 contacts the right shuttle 160 and precludes movement of the right shuttle 160 along the right shuttle track 162. The tension spring 206 biases the carrier 202 so that the shuttle retaining element 192 is biased toward the first location. Movement of the sliding body 172 in the upward direction (per the orientation shown in FIG. 7) moves the shuttle retaining element 192 toward a second location where the shuttle retaining element 192 is not in contact with the right shuttle 160. With reference to FIG. 8, the right shuttle 160 includes a groove 220. The shuttle retaining element 192 is received in the groove 220 when the shuttle retaining element is in the first location. When the sliding body 172 moves upward (per the orientation shown in FIG. 7), the shuttle retaining element 192 rides along the cam surface 186 of the sliding body 172. This results in pivotal movement of the carrier 202 in a direction opposite to the arrow 208 in FIG. 7. This results in movement of the shuttle retaining element 192 in the general direction of arrow 222 in FIG. 8. This allows the shuttle retaining element 192 to move out of the groove 220. With the right shuttle 160 no longer engaged with the shuttle retaining element 192, the right shuttle 160 can move in a downward direction along the right shuttle track 162.

FIG. 9 depicts the manually actuated first linkage 152 in the second position. A first strap 252 (schematically depicted in FIG. 9) connects with the manually actuated first linkage 152 through a connector 254. The manually actuated first linkage 152 is generally L-shaped and includes a lower projection 256 formed with a lower shoulder 258. After the manually actuated first linkage 152 is moved from the first position (shown in FIG. 5) to the second position (shown in FIG. 9) by an operator pulling on the first strap 252, the lower projection 256 moved out of the way of the extension 190 on the sliding body 172. This allows the sliding body to be moved upward (per the orientation shown in FIG. 9).

A spring-loaded button 262 provided on the manually actuated first linkage housing cover 176 is biased in an upward direction so as to engage the lower shoulder 258 to maintain the manually actuated first linkage 152 in the second position. The spring-loaded button 262 is biased in the upward direction by a compression spring 264. With reference back to FIG. 6, the right shuttle 160 includes an extension 266. The extension 266 is not visible in the cross section taken in FIG. 9, however, it is depicted in phantom (broken lines) for clarity purposes. The extension 266 on the right shuttle 160 contacts a carrier button 268, which carries the spring-loaded button 262. When the right shuttle 160 is moved in a downward direction along the right shuttle track 162, the extension 266 moves away from the carrier button 268, and the carrier button 268 is biased in a downward direction by another compression spring 272. This results in the spring-loaded button 262 moving in a downward direction away from the lower shoulder 258. The manually actuated first linkage 152 is biased by a torsion spring (not shown) toward the first position. When the spring-loaded button 262 is moved away from the lower shoulder 258, the manually actuated first linkage 152 pivots back toward the first position, which resets the mechanism.

The manually actuated second linkage 154 is moveable from the initial position shown in FIG. 5 toward a release position in the direction of arrow 156. A second strap 282 (schematically depicted in FIG. 9) connects with the manually actuated second linkage 154. An operator pulls on the second strap 282 to move the manually actuated second linkage 154 from the initial position toward the release position. The manually actuated second linkage 154 is operatively connected with the sliding body 172. Pivotal movement of the manually actuated second linkage 154 from the initial position toward the release position results in translational movement of the sliding body 172 in the upward direction (per the orientation of FIG. 9). This upward movement, however, is precluded when the manually actuated first linkage 152 is in the first position because the extension 190 on the sliding body 172 contacts the lower projection 256 on the manually actuated first linkage 152. Translational movement of the sliding body 172, however, is permitted in the upward direction when the manually actuated first linkage 152 is in the second position.

With reference to FIG. 7, an intermediate linkage 286 connects the manually actuated second linkage 154 with the sliding body 172. The intermediate linkage 286 is pivotally connected with the connector 188 on the sliding body 172 via a fastener (not shown). The intermediate linkage 286 is also pivotally connected with the manually actuated second linkage 154 via a fastener (not shown). Movement of the manually actuated second linkage 154 in the direction of arrow 156 results in upward movement of the intermediate linkage 286, which results in upward movement of the sliding body 172. Upward movement of the sliding body 172 results in upward movement of the cam surface 186, which contacts the shuttle retaining element 192. This results in the shuttle retaining element 192 moving in a direction generally parallel with the arrow 222 (FIG. 8) out of the groove 220 in the right shuttle 160. When the shuttle retaining element 192 is no longer in the groove 220, the right shuttle 160 (and the left shuttle 164) can slide down their respective shuttle tracks 162, 166 to allow the stroller frame 20 to move from the deployed position to the collapsed position.

With reference to FIG. 8, the right shuttle 160 includes a ramped top edge 290 that is sloped downwardly from the extension 266 toward a vertical side edge 292 above the groove 220. As the right shuttle 160 moves in the upward direction from its position with the stroller frame 20 in the collapsed position, the shuttle retaining element 192 contacts the ramped top edge 290, which moves the shuttle retaining element 192 in the direction of arrow 222 until the shuttle retaining element rides to the vertical side edge 292. The shuttle retaining element 192 then rides along the vertical side edge 292 until it moves into the groove 220 due to the biasing force of the tension spring 206 on the carrier 202.

The hinge lock mechanism 150 is shown on the rear right leg 26. The hinge lock mechanism 150, however, could be located on the rear left leg 28.

Figure 10:
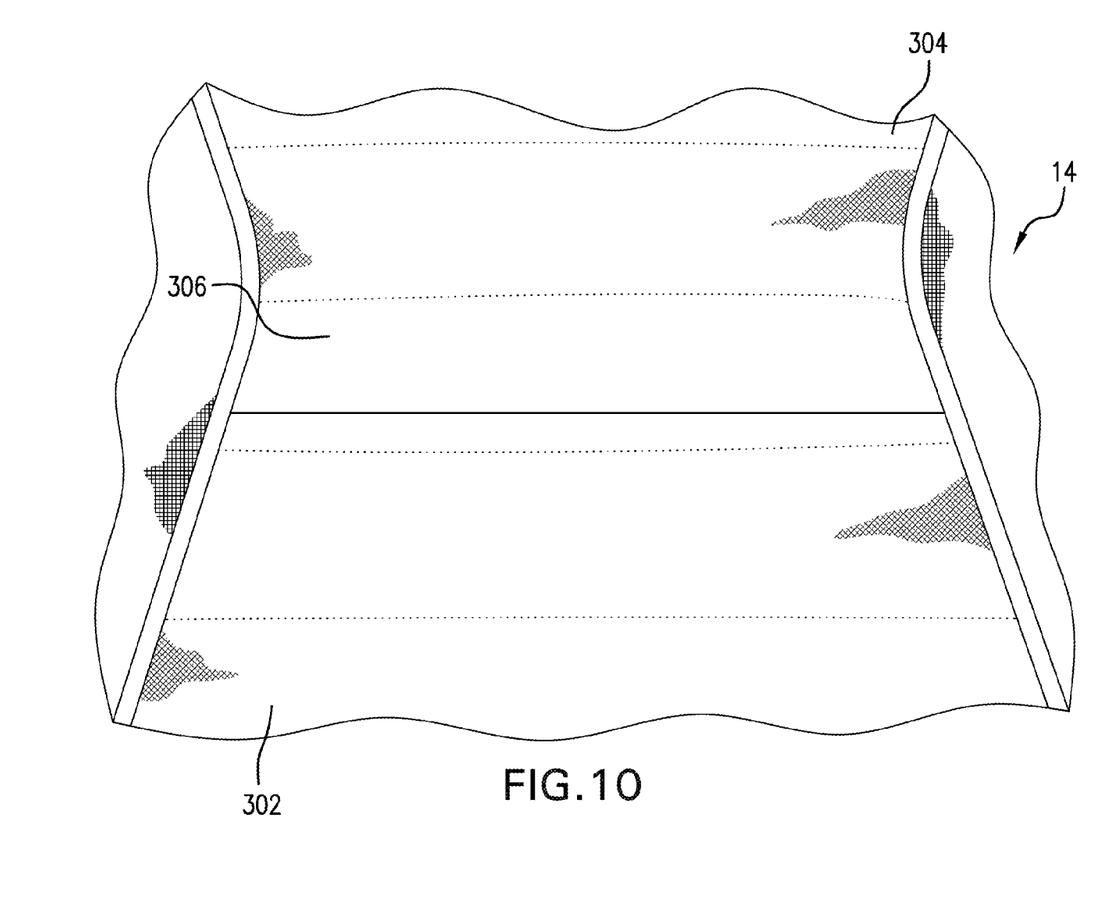
FIG. 10 is a top view of a stroller seat for a stroller having the stroller frame shown in FIG. 1 in the deployed position.
Figure 11:
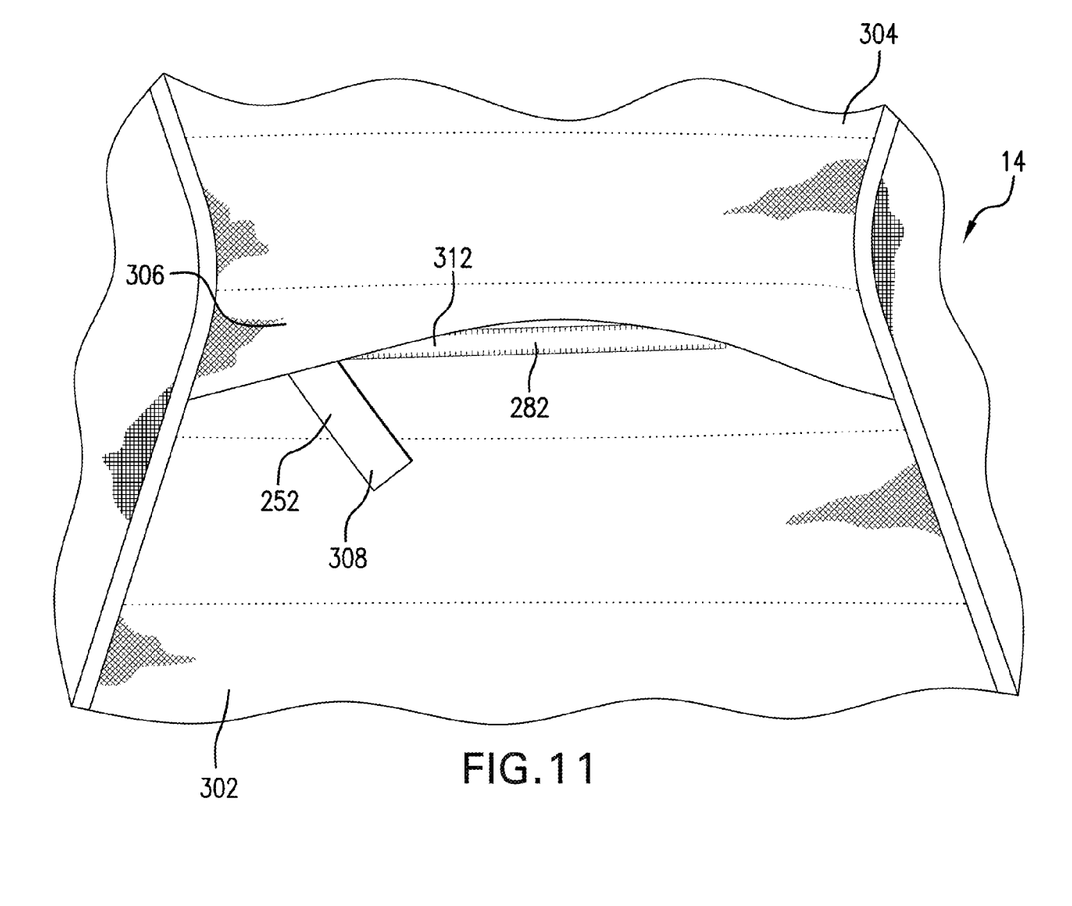
FIG. 11 is a top view of the stroller seat shown in FIG. 10 with a second strap moved to expose a first strap.

With reference to FIG. 10, the seat 14 is shown with a seat base 302 which is typically generally horizontally oriented and a seat back 304, which is typically generally vertically oriented. The seat 14 further includes a flap 306, which can be made of fabric and cover a section of the seat base 302. FIG. 11 shows the flap 306 moved to expose a first strap handle 308 of the first strap 252 and a second strap handle 312 of the second strap 282. As seen when comparing FIGS. 10 and 11, the flap 306 can cover the first strap handle 308 of the first strap 252 and the second strap handle 312 of the second strap 282. Each strap handle 308, 312 is accessible on the seat 14. When the seat 14 is in the typical use configuration shown in FIG. 10, to expose the first strap 252, an operator lifts the flap 306 to expose the first strap handle 308 and the first strap 252. An operator pulls on the first strap 252, which actuates the manually actuated first linkage 152. Next, an operator pulls on the second strap 282 to operate the manually actuated second linkage 154. If only the second strap 282 is pulled, without first pulling the first strap 252 to place the manually actuated first linkage into the second position, then the stroller frame 20 will not fold. As such, a two step operation is employed to fold the stroller. However, since the manually actuated first linkage 152 is able to maintain the second position, only one hand is required to fold the stroller because the first strap 252 can be let go prior to pulling the second strap 282.

As such, a method for collapsing a stroller, such as the stroller 10 shown above, includes moving a manually actuated first linkage 152, which is provided on a stroller frame 20 moveable between a deployed position and a collapsed position, from a first position (shown in FIG. 5) to a second position (shown in FIG. 9) in which the manually actuated first linkage 152 is retained and precluded from movement back toward the first position. With the manually actuated first linkage 152 in the second position, the manually actuated second linkage 154 is moved from an initial position toward a release position. With the manually actuated second linkage 154 in the release position, the stroller frame 20 can be folded from the deployed position (shown in FIG. 1) to the collapsed position (shown in FIG. 4). Moving the manually actuated first linkage 152 can include pulling on a first strap 252 connected with the manually actuated first linkage 152. Similarly, moving the manually actuated second linkage 154 can further include pulling on a second strap 282 connected with the manually actuated second linkage 154.

A collapsible stroller and a method for collapsing the stroller have been described above with particularity. Directional terms, such as, top, bottom, left, right, up, down, over, above, below, beneath, rear, and front are used with respect to the accompanying drawings. Such directional terms should not be construed to limit the scope of the invention in any manner. Modifications and alterations will occur to those upon reading and understanding the preceding detailed description. The invention, however, is not limited to only the embodiments described above. Instead, the invention is broadly defined by the appended claims and the equivalents thereof. Also various presently unforeseen or unanticipated alternatives, modifications, variations or improvements therein may be subsequently made by those skilled in the art which are also intended to be encompassed by the following claims.

The invention claimed is:

1. A collapsible stroller comprising:
   a stroller frame movable between a deployed position and a collapsed position;
   at least one hinge mechanism on the stroller frame which allows for movement of the stroller frame between the collapsed position and the deployed position; and
   a hinge lock mechanism capable of a locked state and an unlocked state, wherein in the locked state the hinge lock mechanism locks the at least one hinge mechanism to maintain the stroller frame in the deployed position, and in the unlocked state the hinge lock mechanism allows the stroller frame to move from the deployed position toward the collapsed position, the hinge lock mechanism including
   a manually actuated first linkage moveable between a first position and a second position;
   a manually actuated second linkage movable from an initial position toward a release position when the manually actuated first linkage is in the second position, when the manually actuated second linkage is in the initial position the hinge lock mechanism is in the locked state, when the manually actuated second linkage is in the release position the hinge lock mechanism is in the unlocked state;
   a first strap connected with the manually actuated first linkage; and
   a second strap connected with the manually actuated second linkage.

2. The stroller of claim 1, further comprising a seat, wherein the first strap includes a first strap handle configured to be gripped by an operator of the stroller and the first strap handle is accessible on the seat.

3. The stroller of claim 2, wherein the seat includes a flap, wherein the flap covers the first strap handle, wherein the flap is movable to expose the first strap handle.

4. The stroller of claim 1, further comprising a seat, wherein the second strap includes a second strap handle configured to be gripped by the operator of the stroller and the second strap handle is accessible on the seat.

5. The stroller of claim 4, wherein the seat includes a flap, wherein the flap covers the second strap handle, wherein the flap is movable to expose the second strap handle.

6. The stroller of claim 1, further comprising a seat, wherein the first strap includes a first strap handle configured to be gripped by an operator of the stroller and the second strap includes a second strap handle configured to be gripped by the operator of the stroller, each strap handle is accessible on the seats.

7. The stroller of claim 6, wherein the seat includes a flap, wherein the flap covers the first strap handle and the second strap handle, wherein the flap is movable to expose the first strap handle and the second strap handle.

8. The stroller of claim 1, wherein when the manually actuated first linkage is in the first position, the manually actuated second linkage is precluded from moving from the initial position toward the release position.

9. A method for collapsing a stroller, the method comprising:
   moving a manually actuated first linkage of a hinge lock mechanism, which is provided on a stroller frame movable between a deployed position and a collapsed position, from a first position to a second position in which the manually actuated first linkage is retained and precluded from movement back toward the first position;
   with the manually actuated first linkage in the second position, moving a manually actuated second linkage from an initial position, in which the hinge lock mechanism is in a locked state, toward a release position; and
   with the manually actuated second linkage in the release position, folding the stroller frame from the deployed position to the collapsed position.

10. The method of claim 9, wherein moving the manually actuated first linkage further includes pulling on a first strap connected with the manually actuated first linkage.

11. The method of claim 10, wherein the first strap is accessible on a seat of the stroller.

12. The method of claim 11, wherein moving the manually actuated second linkage further includes pulling on a second strap connected with the manually actuated second linkage.

13. The method of claim 12, wherein the second strap is accessible on the seat of the stroller.

14. The method of claim 9, wherein moving the manually actuated second linkage further includes pulling on a second strap connected with the manually actuated second linkage.

15. The method of claim 9, further comprising moving a flap on a seat of the stroller to expose a first strap and a second strap;
   wherein moving the manually actuated first linkage further includes pulling on the first strap connected with the manually actuated first linkage after moving the flap; and wherein moving the manually actuated second linkage further includes pulling on the second strap connected with the manually actuated second linkage after moving the flap.

16. A collapsible stroller comprising:
a stroller frame movable between a deployed position and a collapsed position;
at least one hinge mechanism on the stroller frame which allows for movement of the stroller frame between the collapsed position and the deployed position; and
a hinge lock mechanism capable of a locked state and an unlocked state, wherein in the locked state the hinge lock mechanism locks the at least one hinge mechanism to maintain the stroller frame in the deployed position, and in the unlocked state the hinge lock mechanism allows the stroller frame to move from the deployed position toward the collapsed position, the hinge lock mechanism including
a manually actuated first linkage moveable between a first position and a second position in which the manually actuated first linkage is retained and precluded from movement back toward the first position; and
a manually actuated second linkage movable from an initial position toward a release position when the manually actuated first linkage is in the second position, when the manually actuated second linkage is in the initial position the hinge lock mechanism is in the locked state, when the manually actuated second linkage is in the release position the hinge lock mechanism is in the unlocked state.

17. The stroller of claim 16, wherein when the manually actuated first linkage is in the first position, the manually actuated second linkage is precluded from moving from the initial position toward the release position.

18. The stroller of claim 16, further comprising a first strap connected with the manually actuated first linkage.

19. The stroller of claim 18, further comprising a seat, wherein the first strap includes a first strap handle configured to be gripped by an operator of the stroller and the first strap handle is accessible on the seat.

20. The stroller of claim 19, further comprising a second strap connected with the manually actuated second linkage.

* * * * *